United States Patent Office 3,361,821
Patented Jan. 2, 1968

3,361,821
MIXTURE OF NONADECANE DIAMINES
Martin Wallis, Kamen, and Eugen Griebsch, Unna, Germany, assignors to General Mills, Inc., a corporation of Delaware
No Drawing. Original application Nov. 14, 1961, Ser. No. 152,156, now Patent No. 3,303,165, dated Feb. 7, 1967. Divided and this application Sept. 22, 1966, Ser. No. 581,174
1 Claim. (Cl. 260—583)

ABSTRACT OF THE DISCLOSURE

The disclosure relates to a mixture of diamines of the formulae (a) $H_2N-CH_2-(CH_2)_{17}-CH_2NH_2$ and (b) $CH_3-(CH_2)_x-CH-(CH_2)_y-CH_2NH_2$
           $|$
           $CH_2NH$ where $x$ is an integer from 9 to and including 15 and $y$ is an integer of from 0 to and including 6 and the sum of $x$ and $y$ is 15. The mixture of diamines finds utility in the curing of epoxy resins.

---

This application is a division of application Ser. No. 152,156 filed Nov. 14, 1961, now U.S. Patent No. 3,303,165.

This invention relates to novel amine compounds suitable for curing epoxy resins and in particular to a mixture of diamines of the formulae (a) $H_2N-CH_2-(CH_2)_{17}-CH_2NH_2$ and (b) 
$$CH_3-(CH_2)_x-\underset{\underset{CH_2NH_2}{|}}{\overset{\overset{H}{|}}{C}}-(CH_2)_y-CH_2NH_2$$

where $x$ is an integer of from 9 to and including, 15 and $y$ is an integer of from 0 to and including 6, and the sum of $x$ and $y$ is 15.

In the past, nonadecane diamines have been prepared from nonadecane (1,10) or (1,11)-dicarboxylic acids (Reppe and Kroper, Ann., 582, 1953, pp. 64–65). The dicarboxylic acids were prepared by reacting oleic acid with carbon monoxide and water in the presence of a nickel tetracarbonyl catalyst. The diamines so produced have been recommended as hardeners for solid epoxy resins (O. Lissner, Farbe and Lack, 66, 1960, page 17) but are not suitable for use in solventless coatings with liquid epoxy resins because of the formation of turbid films (O. Lissner, Farbe and Lack, 66, 1960, p. 20). Moreover, such films do not possess a high degree of hardness.

When oleic acid is reacted with carbon monoxide and hydrogen in accordance with U.S. Patent 2,891,084, but using a cobalt tetracarbonyl catalyst a mixture of isomeric $C_{19}$ dicarboxylic acids are formed. These isomeric mixtures are formed because the cobaltcarbonylhydrogen in the reaction is a very effective isomerization catalyst resulting in migration of the double bond. This migration is preferably in the direction of the carboxyl group forming preferably isomeric $C_{19}$-dicarboxylic acids of alpha-decylheptanic acid to cetylmelonic acid. In addition, the mixture contains about 10% of 1,7-heptane dicarboxylic acid. Upon nitrilation and hydrogenation of the foregoing acids, a mixture of isomeric diamines as set forth above are provided. These diamines, in addition to being suitable for curing solid epoxy resins, are unexpectedly suitable for solventless coatings with liquid epoxy resins, furnishing without pre-reaction, rapid curing and good films, unexpected in view of the showing of Lissner mentioned above. In addition, the epoxy resin compositions are useful as adhesives, laminating compositions and further provide impact resistant castings.

It is therefore an object to provide novel diamine compounds suitable for curing epoxy resins.

It is also an object of this invention to provide a solventless coating composition.

It is further an object of this invention to provide epoxy resin compositions cured with the novel diamine compounds.

The diamine mixture provided by the present invention is a mixture of compounds having the following formulae:

(a) $H_2N-CH_2-(CH_2)_{17}-CH_2-NH_2$ and (b) 
$$CH_3-(CH_2)_x-\underset{\underset{CH_2NH_2}{|}}{\overset{\overset{H}{|}}{C}}-(CH_2)_y-CH_2NH_2$$

where $x$ is an integer of from 9 to 15 and $y$ is an integer of from 0 to 6 and the sum of $x$ and $y$ is 15. While the amount of compound (a) above in the mixture may vary somewhat, it is usually found present in an amount of about 10% by weight based on the weight of the mixture.

The above diamine mixture is provided by the nitrilation and hydrogenation of the dicarboxylic acids resulting from the process of U.S. Patent 2,891,084, when a cobalt tetracarbonyl catalyst is employed. The nitrilation and hydrogenation are conducted in the conventional manner. Optionally phosphoric acid may be used as a catalyst in the nitrilation reaction and Raney nickel is generally employed in the hydrogenation reaction.

The epoxy resins which may be employed are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. In addition, several of these resins are readily available commercial products. Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction proudct of epichlorohydrin and 2,2-bis(p-hydroxy phenyl) propane (Bisphenol A), the resin having the following theoretical structural formula:

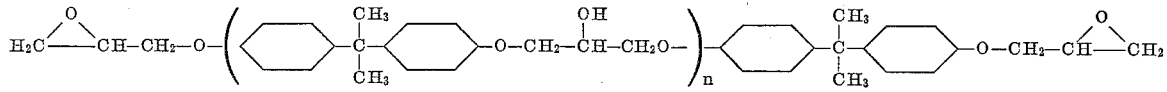

where $n$ is 0 or an integer up to 10. Generally speaking, $n$ will be no greater than 2 or 3 and is preferably 1 or less.

Another of such epoxy resins are those that are the reaction products of epichlorohydrin and bis(terahydroxyphenol)sulfone. Still another group of epoxy compounds which may be employed are the glycidyl esters of the polymeric fat acids. The glycidyl esters are obtained by reacting the polymeric fat acids with epichlorohydrin. In addition, the glycidyl esters are also commercially available epoxide materials. As the polymeric fat acids are composed largely of dimeric acids, the glycidyl esters thereof may be represented by the following theoretical idealized formula:

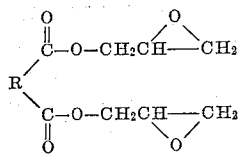

where R is the divalent hydrocarbon radical of dimerized unsaturated fatty acids.

Still another group of epoxide materials are the epoxy novolac resins. Such resins are well known substances and readily available commercially. These resins may be represented by the following theoretical idealized formula:

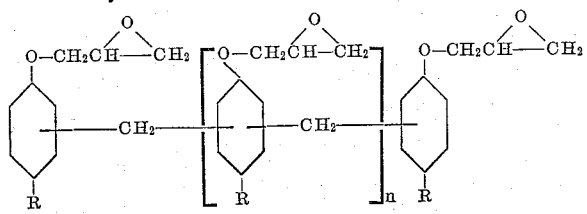

where R is selected from the group consisting of hydrogen and alkyl groups having up to 18 carbon atoms and $n$ is an integer from 1 to 5. In general, $n$ will be an integer in excess of 1 to about 3.

In general, these resins are obtained by reacting epichlorohydrin with the well-known novolac resins. The novolac resins, as is known in the art, are produced by condensing the phenol with an aldehyde in the presence of an acid catalyst. Although novolac resins from formaldehyde are generally employed, novolac resins from other aldehydes such as, for example, acetaldehyde, chloral, butaraldehyde, furfural, and the like, may also be used. The alkyl group, if present, may have a straight or a branched chain. Illustrative of the alkyl phenol from which the novolac resins may be derived are cresol, butylphenol, tertiary butylphenol, tertiary amylphenol, hexylphenol, 2-ethyl hexylphenol, nonylphenol, decylphenol, dodecylphenol, and the like. It is generally preferred, but not essential, that the alkyl substituent be linked to the para position of the parent phenolic nucleus. However, novolac resins in which the alkyl group is in the ortho position have been prepared.

The epoxy novolac resin is formed in the well-known manner by adding the novolac resins to the epichlorohydrin and then adding an alkaline metal hydroxide to the mixture so as to effect the desired condensation reaction.

In general, the epoxy resins may be described as having terminal epoxy groups. Epoxy resins may be characterized further by reference to their epoxy equivalent weight, the epoxy equivalent weight of pure epoxy resins being the molecular weight of the resin divided by the mean number of epoxy radicals per molecule, or in any case, the number of grams of 1 gram-equivalent of epoxide. While certain specific epoxy resins which are the most readily available have been described, it is understood that the epoxy resinous compositions encompassed by this invention are those epoxy resins having an epoxy equivalent weight of from 100–500, the preferred epoxy equivalent weight being 128 to 350, expressed in terms of grams of compound per epoxy group. The liquid epoxy resins are generally employed and will generally have a viscosity in the range of 400–20,000 centipoises at room temperature. Reactive diluents such as the monoalkyl glycidyl ethers may be employed with the Bisphenol A-epichlorohydrin type of epoxy resins to provide a viscosity of 500 to 700 centipoises at room temperature.

The invention can best be illustrated by means of the following examples.

*Example I*

130 parts of a mixture of isomeric $C_{19}$-dicarboxylic acids, prepared in accordance with U.S. Patent 2,891,084 using cobalt tetracarbonyl as a catalyst was heated for 3 hours to 300° C. with agitation while passing through a strong ammonia stream. The formed water was distilled off. Heating was conducted for another 5 hours at 380° C. with addition of 1% orthophosphoric acid to provide a mixture of dinitriles which were recovered.

70 grams of the dinitrile mixture were added to an autoclave with 150 ml. of methanol and 7 grams of Raney nickel. The solution was then saturated with ammonia gas. The hydrogenation was carried out for 2 hours at 120° C. and a pressure of 140 atm. abs. The resulting crude product had an amine number of 355.

30 parts of the amine mixture, distilled at B.P. 130–200° C., were mixed with 70 parts of an epoxide-resin of Bisphenol A and epichlorohydrin having an epoxy equivalent weight of about 190. After 24 hours at room temperature a 20-gram casting of this mixture possessed a ball pressure hardness according to DIN (German Industry Standards) 53,456 of 420 kg./sq. cm., while in 1 hour at 120° C. the ball pressure hardness is 965 kg./sq. cm. The impact toughness according to DIN 53,453 of this mixture heated to 120° C. for 1 hour is 50 cm. kg./cm.

*Example II*

30 parts of the amine mixture employed in Example I were mixed with 70 parts of a butylglycidyl-ether-modified epoxy-resin of Bisphenol A and epichlorohydrin having an epoxy equivalent weight of about 190 and this mixture was, without prereaction, applied with a brush on wood. The coating hardened in a short time to a hard, lustrous film.

Having thus described our invention, we therefore claim:

1. A diamine mixture having about 10% by weight of (a) $\quad H_2N-CH_2-(CH_2)_{17}-CH_2-NH_2$ the remainder being (b) $\quad CH_3-(CH_2)_x-\underset{\underset{CH_2NH_2}{|}}{CH}-(CH_2)_y-CH_2NH_2$ where $x$ is an integer of from 9–15, $y$ is an integer of from 0–6 and the sum of $x$ and $y$ is 15.

References Cited

Reppe et al., Annalen der Chemie, 582 (1953) pp. 64 and 65.

CHARLES B. PARKER, *Primary Examiner.*

R. L. RAYMOND, *Assistant Examiner.*